United States Patent [19]

Bereyziat

[11] 4,153,123

[45] May 8, 1979

[54] HOISTING AND HANDLING DEVICE HAVING WEIGHING MEANS

[75] Inventor: Daniel Bereyziat, Suresnes, France

[73] Assignee: Etablissements DEBOR, Paris, France

[21] Appl. No.: 811,275

[22] Filed: Jun. 29, 1977

[30] Foreign Application Priority Data

Feb. 2, 1977 [FR] France .............................. 77 02895

[51] Int. Cl.² .......................... B66C 1/40; G01G 5/04
[52] U.S. Cl. ..................................... 177/147; 177/208
[58] Field of Search ................................ 177/147, 208

[56] References Cited

U.S. PATENT DOCUMENTS

| | | | |
|---|---|---|---|
| 1,214,745 | 2/1917 | Beard et al. .......................... | 177/147 |
| 1,631,890 | 6/1927 | Redick .................................. | 177/208 |
| 1,901,962 | 3/1933 | Greene ............................. | 177/147 X |
| 1,997,864 | 4/1935 | Hill ..................................... | 177/147 X |
| 2,304,363 | 12/1942 | Johansen .............................. | 177/208 |
| 3,017,939 | 1/1962 | Vegors .................................. | 177/208 |
| 3,517,761 | 6/1970 | Bartley et al. ...................... | 177/147 |
| 3,866,464 | 2/1975 | Franklin ........................... | 177/147 X |
| 3,910,365 | 10/1975 | Buchele ............................ | 177/208 X |

Primary Examiner—George H. Miller, Jr.
Attorney, Agent, or Firm—Schuyler, Birch, Swindler, McKie & Beckett

[57] ABSTRACT

The hoisting device has means for weighing the load and is particularly compact, simple and reliable. For this purpose a pivotal arm to which a hook is connected is adapted in such manner as to define a cylinder, a piston and a chamber filled with an incompressible fluid. This chamber is connected to a pressure gauge which displays information representing the pressure prevailing in the chamber, which pressure is proportional to the load suspended from the hook.

7 Claims, 3 Drawing Figures

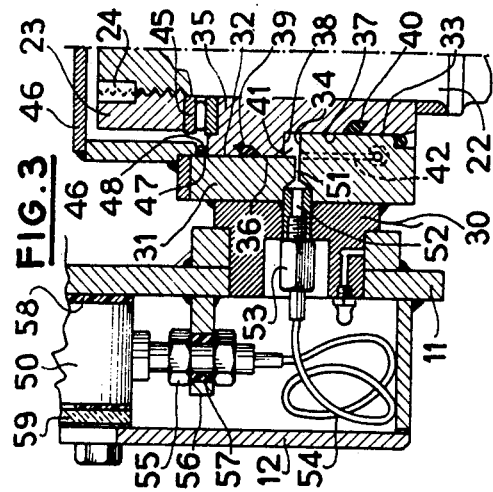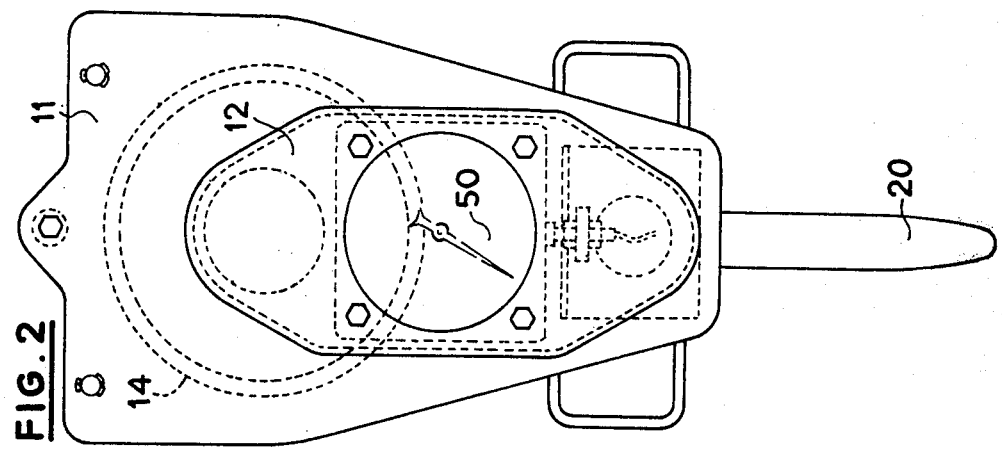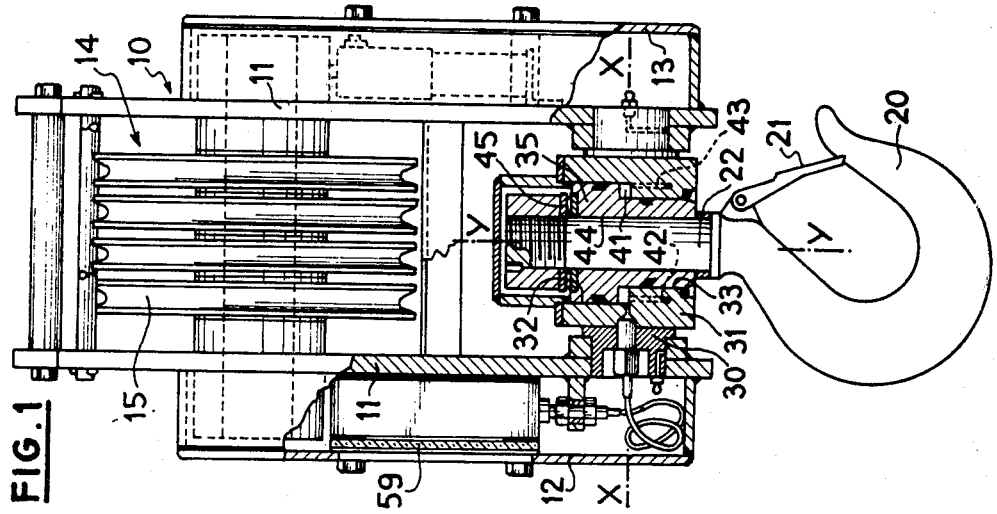

HOISTING AND HANDLING DEVICE HAVING WEIGHING MEANS

The present invention relates to hoisting and handling devices with which there are associated means for weighing the hoisted load. Such devices may in particular be provided for moving cranes, tower cranes, port cranes, block and tackle, gantry cranes or other handling machines.

An arrangement is known in which a hooking means is carried by a frame which also contains pulley-block pulleys which are part of the hoisting means. In this arrangement, one of the pulleys comprises a hollow body in which is disposed a gauge which furnishes an electric signal which varies in accordance with the load carried by the pulley. The fact of incorporating the weighing means in one of the pulley results in a serious drawback which resides in a certain inaccuracy of the measurement due in particular to the fact that the pulley is subjected along each of its sides to friction forces which vary, in particular, over a period of time and are liable to affect the measurement. Moreover, the speed ratio provided by the pulley-block is not constant and it is necessary to provide an auxiliary correcting device which takes into account the variation in this ratio but which also has an adverse affect on the precision of the measurement.

It is also known to associate with the hoisting device a conventional spring dynamometer. However, apart from the poor precision of such a device and a utilisation which is limited to relatively small loads, a major drawback resides in the very large size of such dynamometers.

An object of the invention is to provide a hoisting device with which there are associated weighing means which are of particularly small size and have satisfactory precision and are simple in construction, reliable and relatively cheap.

According to the invention, there is provided a hoisting and handling device comprising a load hooking means carried by an intermediate element which is mounted in a support frame to be rotatable about a first axis, wherein the hooking means is integral with a piston received in a cylinder integral with the intermediate element, the cylinder and piston defining a chamber which is filled with an incompressible fluid and connected to means for measuring pressure which represents the load carried by the hooking means.

The device according to the invention also has the following features:

The piston and cylinder have a stepped shape and sealing means between the piston and cylinder are provided in the region of each of the bearing surfaces between these two elements.

The hooking means is mounted in the piston to rotate about an axis perpendicular to the first-mentioned axis and bears on the piston through the agency of a thrust bearing having rolling elements and there is provided on the element defining the cylinder, or on a member integral therewith, a radial shoulder which limits the displacements of the piston.

Elastically yieldable shock-absorbing means, constituted for example by a ring composed of an elastomer material, is interposed between said radial shoulder and an adjacent surface of the piston.

The pipe connecting the pressure chamber to the pressure gauge extends in said intermediate element and is centered on the axis of rotation of said intermediate element in its frame.

The invention will now be described hereinafter in more detail with reference to the accompanying drawing which is given solely by way of example and in which:

FIG. 1 is a longitudinal sectional view of a hoisting device according to the invention;

FIG. 2 is a side elevational view of the device, and

FIG. 3 is a view to an enlarged scale of a part of this device.

The drawing shows a hoisting device commonly termed a block and takle mainly comprising a support frame 10 made from welded sheet metal and including two parallel side walls 11 to which lateral cases 12, 13 are welded, the purpose of these cases being explained hereinafter. Mounted in the frame is a pulley-block device 14 comprising a plurality of pulleys 15 which will not be described in detail here.

In the lower part of the frame as viewed in FIG. 1, there is supported a hooking means comprising a hook 20 provided with a pawl 21 and extended by a stem 22. Mounted in the lower part of this frame between its two side walls to rotate about an axis X—X, is an intermediate element or pivotal arm 30 which defines in its centre part a stepped cylinder 31 having an axis Y—Y perpendicular to the axis X—X. This stepped cylinder comprises two coaxial bearing surfaces 32, 33 and a radial shoulder 34. Slidably mounted in the cylinder is a piston 35 which also has a stepped shape and comprises two axial bearing surfaces 36, 37 guided in the corresponding bearing surfaces of the cylinder, and a radial shoulder 38. The piston has two sealing rings 39,40 which are located respectively in the region of each of the bearing surfaces thereof and ensure a sliding close fit guiding between the piston and cylinder. These two elements define an annular chamber 41 provided with two conduits, namely a filling conduit 42 and a discharge conduit 43.

The stem 22 of the hook is rotatably mounted in a bore 44 of the piston on the axis Y—Y and bears against the piston through a needle thrust bearing 45. The stem 22 carries in its upper part a nut 23 which is prevented from rotating by a pin 24. The upper end of the hook assembly is protected by a cover 46 which is welded to the cylinder 31, the lower edge of this cover defining a radial abutment 47 which is adapted to limit the upward movements of the piston 35. Provided between the upper face of the piston and the shoulder 47 is a ring 48 composed of an elastically yieldable material which performs the double function of shock-absorbing means and return means.

The chamber 41 defined between the cylinder and the piston is filled with a hydraulic liquid and connected to a pressure gauge 50 by means which will be described hereinafter. Formed in the cylinder and the element 30 integral with the latter are conduits 51, 52 which are centered on the axis X—X and comprise a conduit 51 of small section formed in the cylinder and a conduit 52 of a slightly larger section connected by a rotatable coupling 53 to a flexible pipe 54. Also provided in the rotatable coupling is a valve which allows disassembling the flexible pipe while maintaining the hydraulic liquid in the chamber 41. The flexible pipe is connected to the pressure gauge 50, the coupling 55 being mounted on a bracket 56 welded to the frame through the agency of a sleeve 57 of an elastomer material. The pressure gauge is secured to the frame with interposition of a rubber member 58, whereas other rubber sheets are provided on each side of a transparent protecting plate 59. The assembly of the load measuring device, and in particular the pressure gauge, is protected by the lateral case 12.

The other lateral case 13 contains a device for lubricating the pulleys of the pulley-block.

The device just described operates in the following manner:

When a load is carried by the hook 20, the weight thereof is transmitted by the hook to the piston 35 which compresses the liquid contained in the chamber 41. Owing to the hardness of the sealing elements 39 and 40, the movements of the piston with respect to the cylinder are slow so that pressure shocks on the pressure gauge are avoided. These shocks are also reduced owing to the presence of the small-section conduit 51 between the chamber and the pressure gauge. The pressure transmitted from the chamber 41 to the pressure gauge, which is graduated in units of weight, is a function of the load carried and provides a precise indication of the magnitude of this load.

When the hook strikes against an obstacle in travelling downwardly, it is subjected to an upward force and the elastically yieldable ring 48 precludes a metal-to-metal abutment between the piston and the cover and limits the movements of the piston by preventing the creation of a suction in the chamber 41. Moreover, this ring ensures that the piston returns to the correct position. Another advantage of this arrangement is that variations in the volume of the liquid contained in the chamber, and in particular expansions due to a temperature rise, can be absorbed.

It is thus clear that this device is particularly small since it is incorporated within the pivotal arm of the hook and no increase of the length of the hook stem is necessary. Moreover, it enables a pressure which represents the load to be detected directly, independently of the number of the pulleys of the pulley-block and of the speed ratio established within the pulley-block. Further, the component parts are all simple in design and construction. The device is therefore particularly reliable and may be employed for loads ranging from about 5 to about 300 metric tons. The pressures created are conventional in this art and reach 400 bars for a nominal load and 600 bars for a maximum load which is usually 50% higher than the nominal load.

It may be mentioned that the precision of this measuring device is of the order of to within 2% of the nominal load, the pressure gauge employed having a precision of to within 6 to 7 thousandths of the maximum pressure of 600 bars, the precision of the load indicator, that is, the pressure gauge being therefore to within 1% of the nominal load. The precision of the measurement of the detector, bearing in mind the dimensions of the latter, the adherence of the sealing elements, the characteristics of the hydraulic liquid is at the most equal to within 1% of the nominal load so that the overall precision is to within about 2%.

In the illustrated embodiment, the pivotal arm 30 is constructed from three members which are assembled by welding and define, on one hand, the trunnions of the pivotal mounting in the frame and, on the other hand, the cylinder 31. It will be understood that this arm could be made in a single piece.

Known means may be provided for transmitting at a distance the information provided by the pressure signal.

Having now described my invention what I claim as new and desire to secure by Letters Patent is:

1. A hoisting and handling device comprising a support frame, an intermediate unit mounted in the support frame to rotate about a first axis, a load hooking means carried by the intermediate unit, said intermediate unit having an element defining a cylinder, a cover fixed at the upper part of said element and a stepped piston mounted in the cylinder and defining therewith a sealed annular chamber, an incompressible fluid filling the chamber and means for measuring pressure connected to the chamber, said pressure representing the load carried by the hooking means, said hooking means having a stem extending through the intermediate unit and mounted to rotate therein about a second axis perpendicular to said first axis, a member supported at the upper end of the stem and a rolling thrust bearing interposed between the piston and said member, said cover enclosing said member and said thrust bearing, abutment means being provided on the intermediate unit and cooperating with the upper face of the piston for limiting the upward movement of the piston in the cylinder, with interposition of an elastically yieldable shock-absorbing means between said abutment means and the upper face of the piston.

2. A device as claimed in claim 1, wherein the shock-absorbing means comprise a ring of elastomer material.

3. A device as claimed in claim 1, wherein said abutment means is defined by said cover.

4. A device as claimed in claim 1, comprising a pressure gauge and means connecting the chamber to the pressure gauge, said means comprising a conduit defined in said intermediate element and centered on the axis of rotation of the intermediate element in the frame, and a flexible pipe extending between said conduit and the pressure gauge.

5. A device as claimed in claim 4, wherein the pressure gauge is mounted on the frame with interposition of flexible blocks.

6. A device as claimed in claim 4, comprising a case and a transparent plate which partly closes the case, the case protecting the pressure gauge.

7. A device as claimed in claim 4, wherein said conduit comprises a first conduit section of smaller cross-sectional area formed in the cylinder and a second conduit section of larger cross-sectional area connected by a rotatable coupling to the flexible pipe.

* * * * *